June 3, 1941.  L. K. TILANDER  2,243,925
PORTABLE GRINDING DEVICE, ESPECIALLY FOR GRINDING OF CRANKSHAFTS
Filed Feb. 1, 1939
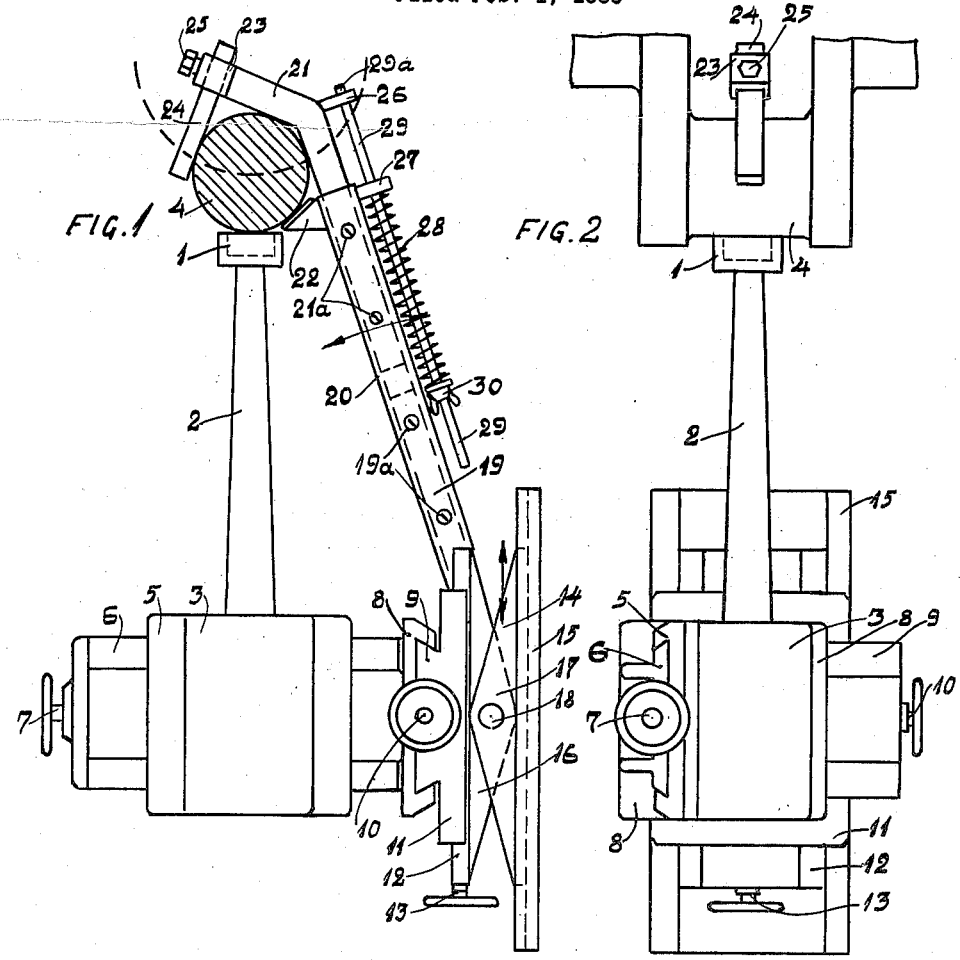
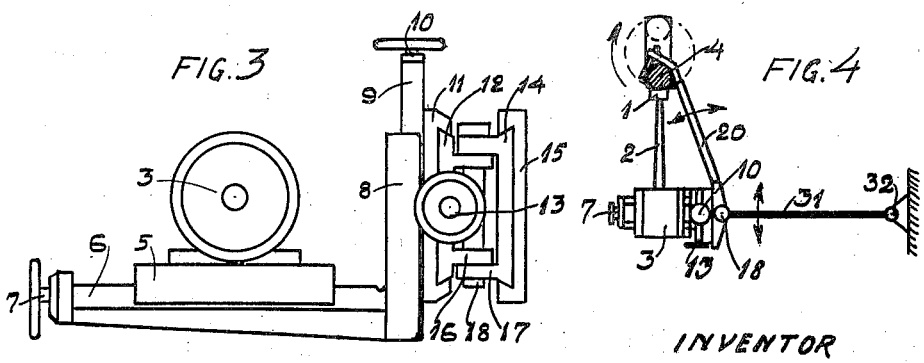
INVENTOR
LAURI KARL TILANDER
BY Richards & Geier
ATTORNEYS Patented June 3, 1941

2,243,925

UNITED STATES PATENT OFFICE 2,243,925

PORTABLE GRINDING DEVICE, ESPECIALLY FOR GRINDING OF CRANKSHAFTS

Lauri Karl Tilander, Helsingfors, Finland

Application February 1, 1939, Serial No. 253,986
In Finland December 23, 1938

5 Claims. (Cl. 51—56)

Many grinding machines used for circular grinding are known in prior art, the simplest machines being used for grinding pins, shafts and the like. These machines cannot be used for the grinding of complicated elements such as crankshafts and particularly crankpins of the crank shafts. There are also machines which may be used for the last-mentioned purpose but they all have the drawback that the affixing and counterbalancing of the work piece takes a great deal of time and is quite difficult to accomplish. The crankshaft often bends and is vibrated. These machines are heavy and stationary so that the crankshaft must be carried to the machine and any repairs on the crankshaft cannot be carried out on location but require a demounting and transportation and thus involve a great deal of additional work.

It is true, however, that there are tools known in prior art and provided with cutting edges which remove shavings from the shaft or the pin to be ground, but they do not operate properly, they cannot be used for a parallel grinding of the pin, they remove an unproportional amount of metal from the shaft or the pin and therefore, they cannot be used for precision work.

An object of the present invention is to remove the above-mentioned drawbacks through the provision of a portable grinding device which, for instance, may be attached to a rotary planer, or may be used as a portable device which is affixed at the proper place and in the proper position for carrying out its work. In this device the grinding wheel, which is used for grinding a shaft, a pin, an eccentric or the like, is caused to follow the path of the pin through the use of special clamping devices, said path being circular or of any other form. The grinding wheel grinds the crankpin uniformly around the edges and parallel to the longitudinal axis of the crankshaft. The device can be easily transported and attached upon the crankshaft or the crankpin to be ground.

The drawing illustrates an embodiment of the invention and two ways in which the device may be mounted or attached. Figure 1 shows a device in side-elevation while it is attached to a sliding base. Figure 2 is a front view of the device. Figure 3 is a rear view of the device and Figure 4 shows a device while it is swingably or oscillatably supported.

The guide 15 of the device is attached to the support of the rotary planer (not shown) in such a manner that it extends at right angles to the longitudinal axis and the prism of the rotary planer. The crankshaft which is to be ground is supported in the longitudinal direction of the planer and in the bearings thereof by means of any suitable device, for instance, for the use of Y-shaped supports (not shown). The crankshaft is so placed that it can rotate about its longitudinal axis, for instance, by means of a pulley mounted on the shaft and driven by an electrical motor and belt-transmission (not shown).

The grinding device is shifted by moving the support relatively to the crankpin to be ground. In the disclosed example the pin 4 is to be ground. After the spindle 2 and the grinding disc 1 have been placed at right angles to the axis of the pin 4, the grinding device is coupled with the pin 4 by means of holders or clamps 21, 22 and 24. These clamps are movable in the clamping arm or bracket 20 and their position can be adjusted by the adjusting screws 21a cooperating with the spring 28. The spindle 29 and the yoke 29a along with the bracket or support 26 and the spring support 27 cooperate with the clamps 21, 22, and 24 to hold the pin 4 in the course of the grinding. The clamp 24 is adjustably mounted in the opening 23 provided in the clamp 21 and is held therein by the fixing screw 25.

The crankshaft which is to be ground is rotated and thus the clamps of the grinding device which follow the movements of the pin 4 cause the entire device to reciprocate in planes indicated by the arrows. Then the guide 5 is adjusted by operating the shifting screw 7 in relation to the guide 6 and thus the spindle 2 and the grinding wheel 1 are adjusted in relation to the middle of the pin 4. Before this operation takes place, the vertical shifting means 13 cooperating with the guide 11 are operated in such manner that the grinding wheel 1 is removed out of contact with the pin 4.

The operator switches on the electrical motor 3 and thus causes a rotation of the spindle 2 and the grinding wheel 1. By regulating the shifting means 13 the grinding wheel 1 is caused to grind the middle portion of the pin 4. The slide 11 is moved in the guide 12, while the grip 19 is firmly connected with the guide 12 and is also adjustably connected by the screws 19a with the bracket 20. By regulating the adjusting means 7, the grinding wheel is reciprocated until a round surface is formed in the middle of the pin, which is used for guiding the clamps 21, 22 and 24 in the course of the grinding.

Then the grinding wheel is reciprocated along the pin by means of the transversal feed 10, the guide 9 and the guiding slide 8 until the grinding of the pin is completed.

In order to grind the next pin, the clamps 21, 22 and 24 must be removed and then placed over the next pin.

In the described example, the removal of the clamps 21, 22 and 24 takes place by loosening the T-shaped yoke 29a situated at the end of the spindle 29 which guides the spring 28. The yoke 29a is mounted upon the rear of the lower clamp 21 which slides within the hollow arm 20. The yoke 29a is removed by adjusting the tightening nut 30 which compresses the spring 28 and then turning the yoke 29a in the direction of the opening of the support 26. Then all the clamps 21, 22 and 24 may be withdrawn and the guiding device is freed, so that it can be moved to the selected position.

In the course of the grinding of a crank pin, the entire grinding device is reciprocated at right angles to the axle of the crank pin upon the slide 14 and the guide 15, and it swings in a vertical plane upon the pin 18 which couples the guide 12 with the guiding slide 14 by means of the eyes 16 and 17.

In the course of the grinding of a pin of the main bearing, no reciprocation or swinging of the device takes place, and only the three guiding and adjusting devices are in operation.

When necessary, for instance, when a shaft which is to be ground cannot be transported to the repair shop, or if there is no room for it upon the planer, then the shaft can be placed upon any desired support or remain in its original location, and then the grinding device may be placed upon a swinging support and so moved in relation to the shaft that it is caused to occupy a correct position in the longitudinal direction as well as the transverse direction. This is shown in Figure 4 wherein the swinging support 31 is attached to the floor or the like by means of the support 32. The upper end of the swinging support 31 is directly connected with the pin 18 of the sliding means while the slide 14 and the guide 15 are removed. The power necessary for the reciprocation of the device is comparatively small and the device operates in the same manner as that already described.

The grinding device may be mounted upon a long guide or a prism and then it can be used for grinding crank shafts or straight shafts of any desired length. Furthermore, the device can be used for many other different purposes, for instance, for the grinding of eccentrics and the like. The electro-motor may be substituted by any other suitable means for transmitting power to the spindle 2, and the device may be supplemented by other means known in the art without exceeding the scope of the invention.

Having now particularly described and ascertained the nature of my said invention and in what manner the same is to be performed, I declare that what I claim is:

1. A portable grinding device for crank shafts, comprising a grinding spindle for a grinding wheel, a casing supporting said spindle, means firmly connected with said casing for driving said spindle, means firmly connected with said casing for shifting said spindle in the longitudinal direction of the crankshaft to be ground, means firmly connected with said casing for shifting said spindle transversely to said direction, means firmly connected with the second-mentioned means for shifting said spindle toward and away from the crankshaft, whereby said spindle, said casing and said four means are movable together as a single unit, clamping means for clamping the pin of the crank shaft to be ground, means connecting said clamping means with one of said shifting means, and movable means connected with said connecting means.

2. A portable grinding device for crank shafts, comprising a grinding spindle for a grinding wheel, a casing supporting said spindle, means firmly connected with said casing for driving said spindle, means firmly connected with said casing for shifting said spindle in the longitudinal direction of the crankshaft to be ground, means firmly connected with said casing for shifting said spindle transversely to said direction, means firmly connected with the second-mentioned means for shifting said spindle toward and away from the crankshaft, whereby said spindle, said casing and said four means are movable together as a single unit, clamping means for clamping the pin of the crank shaft to be ground, a clamping arm connected with said clamping means, means connecting said clamping arm with one of said shifting means, and means connected with said connecting means for guiding the same in a direction perpendicular to said pivotal connection, whereby said unit is reciprocated in two perpendicular directions, and said clamping arm is moved in a manner similar to that of a connecting rod when said clamping means are operatively connected to the pin of a crank shaft rotated about its longitudinal axis and when said spindle extends at right angles to said longitudinal axis.

3. A device in accordance with claim 2, comprising means adjusting the position of said clamping means, and means automatically pressing said clamping means against the object to be clamped.

4. A portable grinding device for crank shafts, comprising a grinding spindle for a grinding wheel, a casing supporting said spindle, means firmly connected with said casing for driving said spindle, means firmly connected with said casing for shifting said spindle in the longitudinal direction of the crankshaft to be ground, means firmly connected with said casing for shifting said spindle transversely to said direction, means firmly connected with the second-mentioned means for shifting said spindle toward and away from the crankshaft, whereby said spindle, said casing and said four means are movable together as a single unit, clamping means for clamping the pin of the crank shaft to be ground, means connecting said clamping means with one of said shifting means, a guide extending in a direction perpendicular to that of said crank shaft, and a slide carrying said connecting means and slidable in said guide.

5. A portable grinding device for crank shafts, comprising a grinding spindle for a grinding wheel, a casing supporting said spindle, means firmly connected with said casing for driving said spindle, means firmly connected with said casing for shifting said spindle in the longitudinal direction of the crankshaft to be ground, means firmly connected with said casing for shifting said spindle transversely to said direction, means firmly connected with the third-mentioned means for shifting said spindle toward and away from said crankshaft, whereby said spindle, said casing and said four means are movable together as a single unit, clamping means for clamping the pin of the crank shaft to be ground, means connecting said clamping means with one of said shifting means, a support, and means connecting said connecting means with said support.

LAURI KARL TILANDER.